United States Patent
Moshonas et al.

(10) Patent No.: US 6,192,877 B1
(45) Date of Patent: Feb. 27, 2001

(54) BLOWN AIR DISTRIBUTOR FOR A CONVECTION OVEN

(75) Inventors: Georges Moshonas, Montréal; Waldo Silva, Ville St-Laurent; Georges Vatista, Laval, all of (CA)

(73) Assignee: Zesto Food Equipment Manufacturing Inc., Montreal (CA)

( * ) Notice: Subject to any disclaimer, the term of this patent is extended or adjusted under 35 U.S.C. 154(b) by 0 days.

(21) Appl. No.: 09/319,020

(22) PCT Filed: Jun. 13, 1997

(86) PCT No.: PCT/CA97/00420

§ 371 Date: May 28, 1999

§ 102(e) Date: May 28, 1999

(87) PCT Pub. No.: WO98/23903

PCT Pub. Date: Jun. 4, 1998

(30) Foreign Application Priority Data

Nov. 29, 1996 (CA) .................................................. 2191786

(51) Int. Cl.[7] .............................. A21B 1/00; F24C 15/32
(52) U.S. Cl. ...................... 126/21 A; 126/15 A; 126/22; 99/447; 34/225; 432/145
(58) Field of Search .............................. 126/21 A, 21 R, 126/19 R, 15 R, 15 A, 50, 22; 219/388, 400; 99/443 C, 443 R, 447, 477; 34/216, 217, 225; 432/145, 152

(56) References Cited

U.S. PATENT DOCUMENTS

| | | | |
|---|---|---|---|
| 2,337,006 | 12/1943 | Stephens | 107/57 |
| 4,338,911 | * 7/1982 | Smith | 126/21 A |
| 4,462,383 | * 7/1984 | Henke et al. | 126/21 A |
| 4,492,839 | * 1/1985 | Smith | 126/21 A |
| 4,750,276 | * 6/1988 | Smith et al. | 34/225 |
| 4,753,215 | 6/1988 | Kaminski et al. | 126/21 |
| 4,873,107 | * 10/1989 | Archer | 126/21 A |
| 4,951,648 | * 8/1990 | Shukla et al. | 126/21 A |
| 4,965,435 | * 10/1990 | Smith et al. | 126/21 A |
| 5,231,920 | * 8/1993 | Alden et al. | 99/443 C |
| 5,408,921 | * 4/1995 | Persson et al. | 99/443 C |
| 5,423,248 | 6/1995 | Smith et al. | 99/443 |
| 5,584,237 | * 12/1996 | Moshonas | 99/443 C |

FOREIGN PATENT DOCUMENTS

| | | |
|---|---|---|
| 0094816 | 5/1983 | (EP) . |
| 0286759 | 12/1987 | (EP) . |
| WO9641499 | 12/1996 | (WO) . |

* cited by examiner

*Primary Examiner*—Ira S. Lazarus
*Assistant Examiner*—Josiah C. Cocks
(74) *Attorney, Agent, or Firm*—McDermott, Will & Emery

(57) ABSTRACT

A blown air distributor for use in a convection oven having a blower that draws air from the baking chamber, a heat source to heat the drawn air and a plenum downstream from the blower to recirculate the heated air in the baking chamber. The blown air distributor has a plurality of finger ducts mounted in parallel on a single plate, which is removable from the baking chamber. Each finger duct has an air inlet to receive the heated air from the plenum and a plurality of air outlets to dispense the heated air in the baking chamber. The single plate has opposite side edges each slidably receivable in a guide way provided on a corresponding sidewall of the chamber. The single plate also has a plurality of air inlets that receive the air from the baking chamber and drawn by the blower. The blown air distributor is easily and rapidly installable without incorrectly placing each finger duct in the baking chamber. The blown air distributor is also easily dismantled for cleaning.

9 Claims, 6 Drawing Sheets

US 6,192,877 B1

BLOWN AIR DISTRIBUTOR FOR A CONVECTION OVEN

FIELD OF THE INVENTION

The present invention relates to an improved blown air distributor suitable for use with a convection oven that cooks food by impingement.

BACKGROUND OF THE INVENTION

Impingement food ovens are mostly used in fast food restaurants for rapidly cooking food such as pizza, pre-cooked meals, sea food souffle, cookies, etc. by air streams which impinge against the surface of the food products. Example of prior art impingement food oven are described by way of example in U.S. Pat. No. 5,584,237 in the name of the applicant; U.S. Pat. Nos. 5,584,237; 5,423,248; 4,965,435; 4,462,383; and 4,753,215.

There is also the reference EP-0286759, which discloses a convection oven comprising a plurality of finger ducts mounted in parallel in the baking chamber of the oven. Each of the finger ducts has an air inlet to receive heated air from a plenum and a plurality of air outlets to dispense the heating air in the baking chamber.

Most of prior art impingement food oven comprises finger ducts mounted in the cabinet of the oven above and below a conveyor to form streams of forced heated air which are directed towards the product on a conveyor. In general, the finger ducts rapidly become dirty or fouled up and must be regularly cleaned up. In prior art, the finger ducts are independent from each other so that they are mounted or dismounted one by one by sliding each one of those in guide rails adapted to receive a corresponding finger duct. As can be easily understood, the cleaning up of all the finger ducts is time-consuming and very expensive because each of those finger ducts has to be removed, cleaned up and put back in the oven, one after another. Moreover, often, the finger ducts are not put back in their proper place, causing an improper cooking of the products. There is thus presently a need for an impingement convection oven provided with finger ducts that may be rapidly and easily dismounted from the oven or installed therein.

Another drawback often encountered with the elongated finger ducts of prior art impingement food ovens is that the heated air leaving the plenum and forced in each finger duct is moved directly to the opposite end of the finger duct due to its high velocity and causes the food to be cooked uneven. Attempts to resolve this problem by using deflectors mounted inside the finger duct in order to apportion the incoming air flow therein have been proposed in U.S. Pat. Nos. 4,462,383 and 5,423,248. However the design of the deflectors proposed in those prior art documents have not shown satisfactory results and often does not provide a uniform cooking between the product on the front portion of the conveyor and the one in the back portion. There is thus also a need for an impingement convection oven that will consistently show a uniform cooking throughout the oven.

OBJECTS OF THE INVENTION

Accordingly, it is an object of the present invention to provide a blown air distributor suitable for use with a convection oven that satisfies the above-mentioned need of having finger ducts that may be rapidly and easily dismounted from the oven or installed therein.

Another object of the invention is to provide a blown air distributor for a convection oven that shows a very good distribution of heated air throughout the baking chamber.

A further object of the invention is to provide a convection oven which is very economic in term of the energy required for its operating.

SUMMARY OF THE INVENTION

The blown air distributor according to the present invention is suitable for use with a convection ovens of the type comprising a baking chamber and a convection system including a blower to draw air from the baking chamber, a source of heat to heat the air drawn from the baking chamber and a plenum in open communication and downstream from the blower to recirculate heated air into the baking chamber, the blown air distributor comprising:

a plurality of finger ducts mounted in parallel in the baking chamber, each finger duct having an air inlet to receive the heated air from the plenum and a plurality of air outlets to dispense the heated air in the baking chamber;

the blown air distributor being characterized in that:

the finger ducts are mounted on a single plate removable from the baking chamber; and the single plate has opposite side edges each slidably receivable in a guide way provided on a corresponding side wall of the baking chamber, the single plate being also provided with a plurality of air inlets to receive the air from the baking and drawn by the blower, thereby providing a communication between the baking chamber and the blower.

A convection oven may advantageously be provided with only one blown air distributor according to the present invention or preferably two, one for installation over the food to be cooked and the other one for installation under the food.

According to a preferred embodiment of the present invention, the blown air distributor is characterized in that it comprises an adjustable deflector in each finger duct to control a flow of heated air therein. Preferably, each of the adjustable deflector comprises an inclined baffle wall having two opposite side edges secured to a corresponding side wall of the finger duct. The baffle wall has a back end extending towards the inlet of the finger duct and a front end extending towards a front end wall of the finger duct.

A controllable plate having an end hinged to the back end of the baffle wall is provided. This controllable plate is pivotable between a downward position where most of the heated air received through the inlet of the finger duct is directed towards the front end wall of the finger duct and an upward position where most of the heated air received through the inlet of the finger duct is directed generally under the baffle wall. The plate is controllable by means of an operating handle mounted on an outer surface of the finger duct and operatively connected to the controllable plate to pivot the plate between the downward and the upward position.

Another object of the present invention is also to propose a combination of a blown distributor with a convection oven as described hereinbefore.

According to a preferred embodiment of such combination the convection oven is characterized in that it comprises an aerodynamically-shaped duct defining the plenum of the oven. The aerodynamically-shaped duct has an inlet in open communication with the blower and an outlet in open communication with the inlet of each of the finger duct.

As can be appreciated, the blown air distributor according to the present invention, thanks to the fact that all the finger ducts are mounted on a single plate slidable into the baking chamber, is very easy and rapid to install without mixing up the respective emplacement of each finger ducts in the baking chamber. It is also very simple to dismount for cleaning up. According to a preferred embodiment of the invention comprising an adjustable deflector within the finger ducts, the blown air distributor allows a user to easily and rapidly adjust the degree of cooking required in the baking chamber. The deflector may be adjust to obtain a uniform cooking throughout the baking chamber or there may also be adjust to obtain different degrees of cooking.

A non-restrictive description of a preferred embodiment will now be given with reference to the appended drawings.

DESCRIPTION OF A PREFERRED EMBODIMENT

Figure 1:
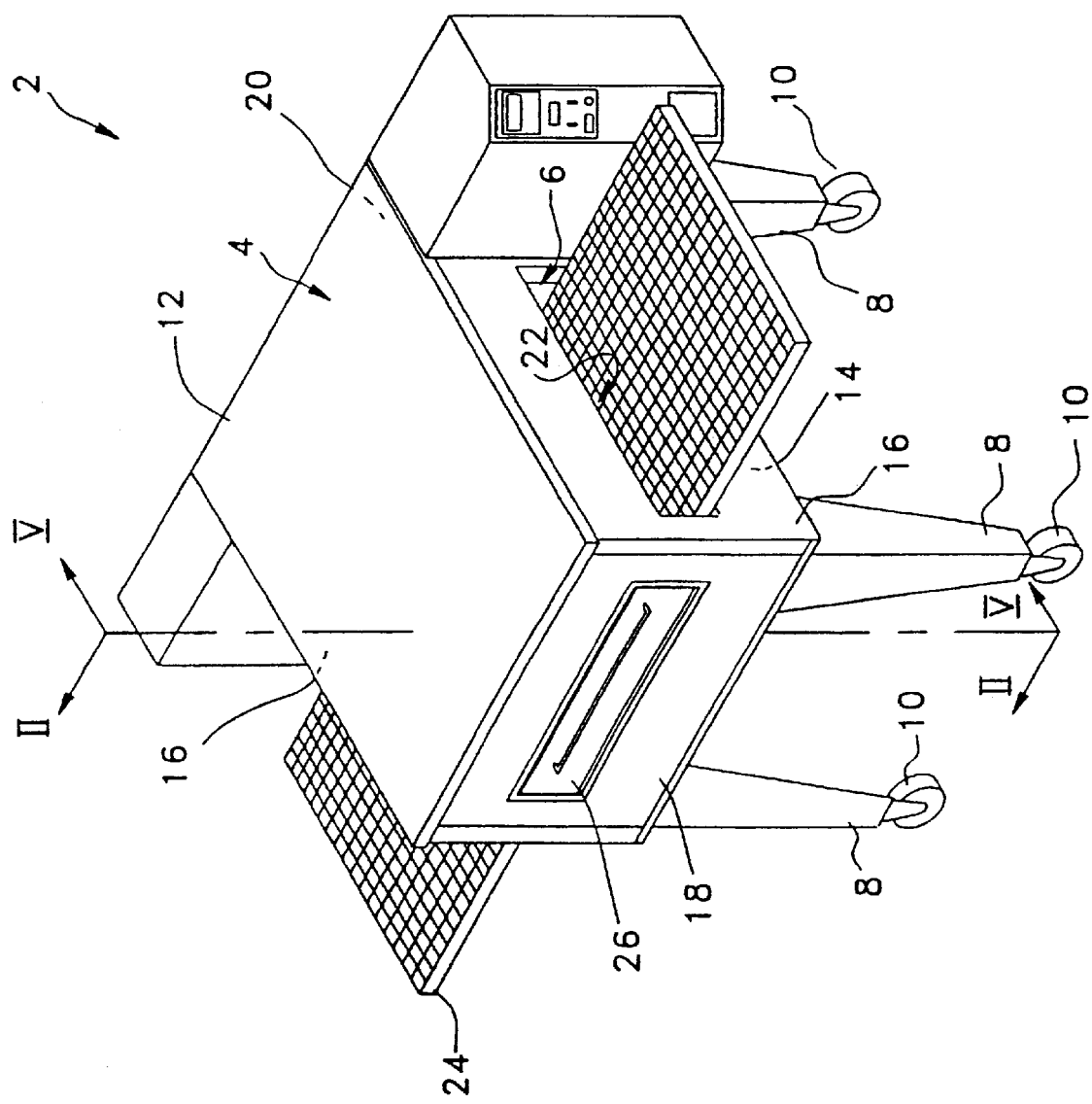
FIG. 1 is a front perspective view of an impingement convection oven embodying two blown air distributors according to the invention.
Figure 2B:
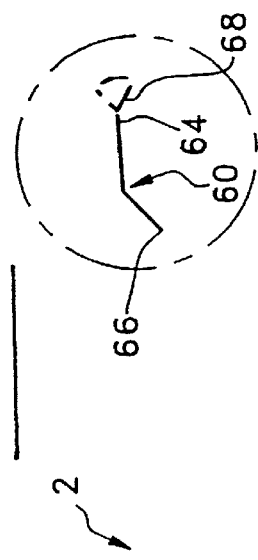
FIG. 2b is an enlarged partial view of FIG. 2a showing an adjustable deflector.
Figure 5:
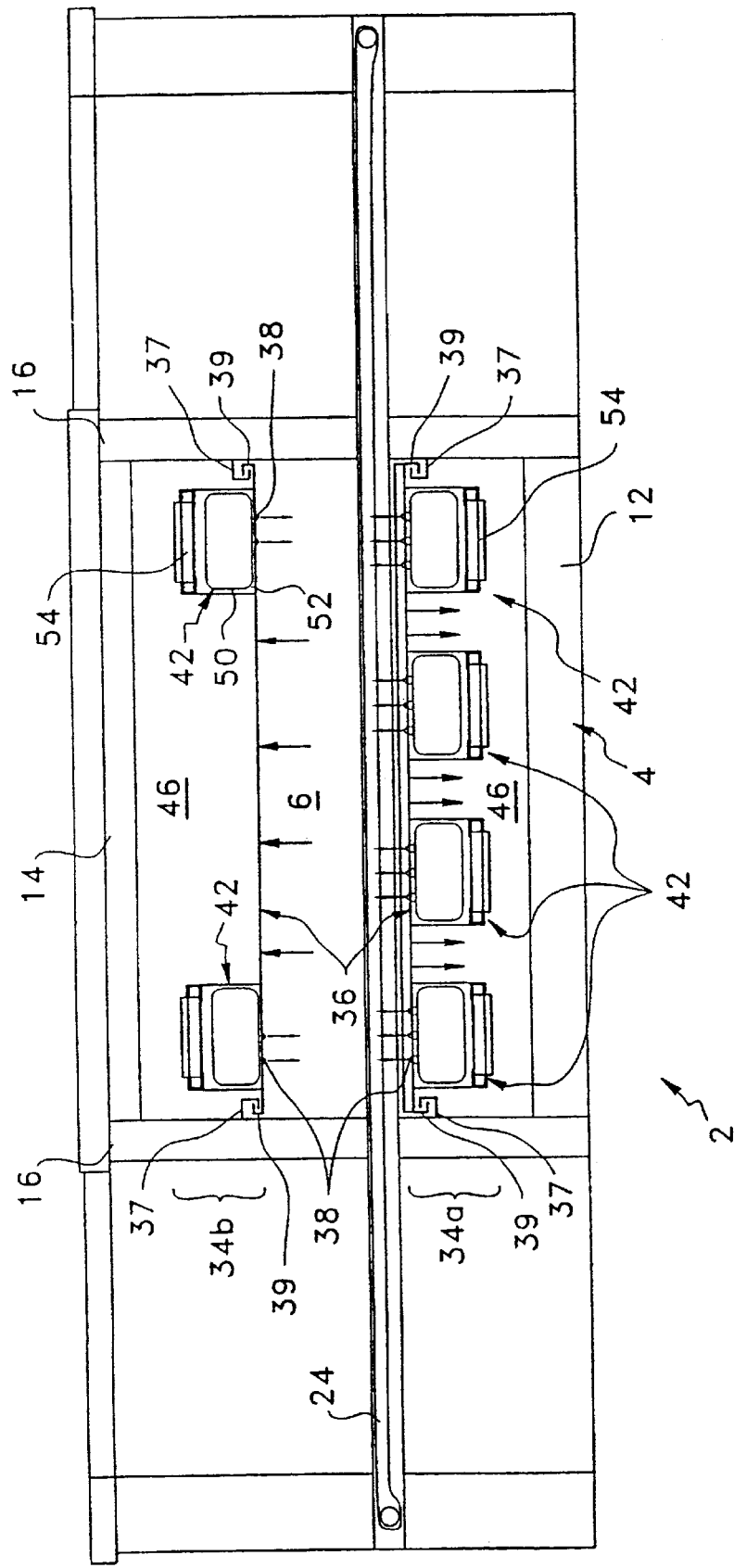
FIG. 5 is a cross-sectional view of the oven of FIG. 1 taken along line V—V.

Referring to FIG. 1, the convection food oven (2) includes an enclosure (4), also called a cabinet, which defines a baking chamber (6) best shown in FIGS. 2 and 5. In the embodiment shown, the oven (2) is supported on legs (8) mounted on rollers (10). The oven suitable for the invention is also intended to be stackable and not provided with such legs.

Figure 2A:
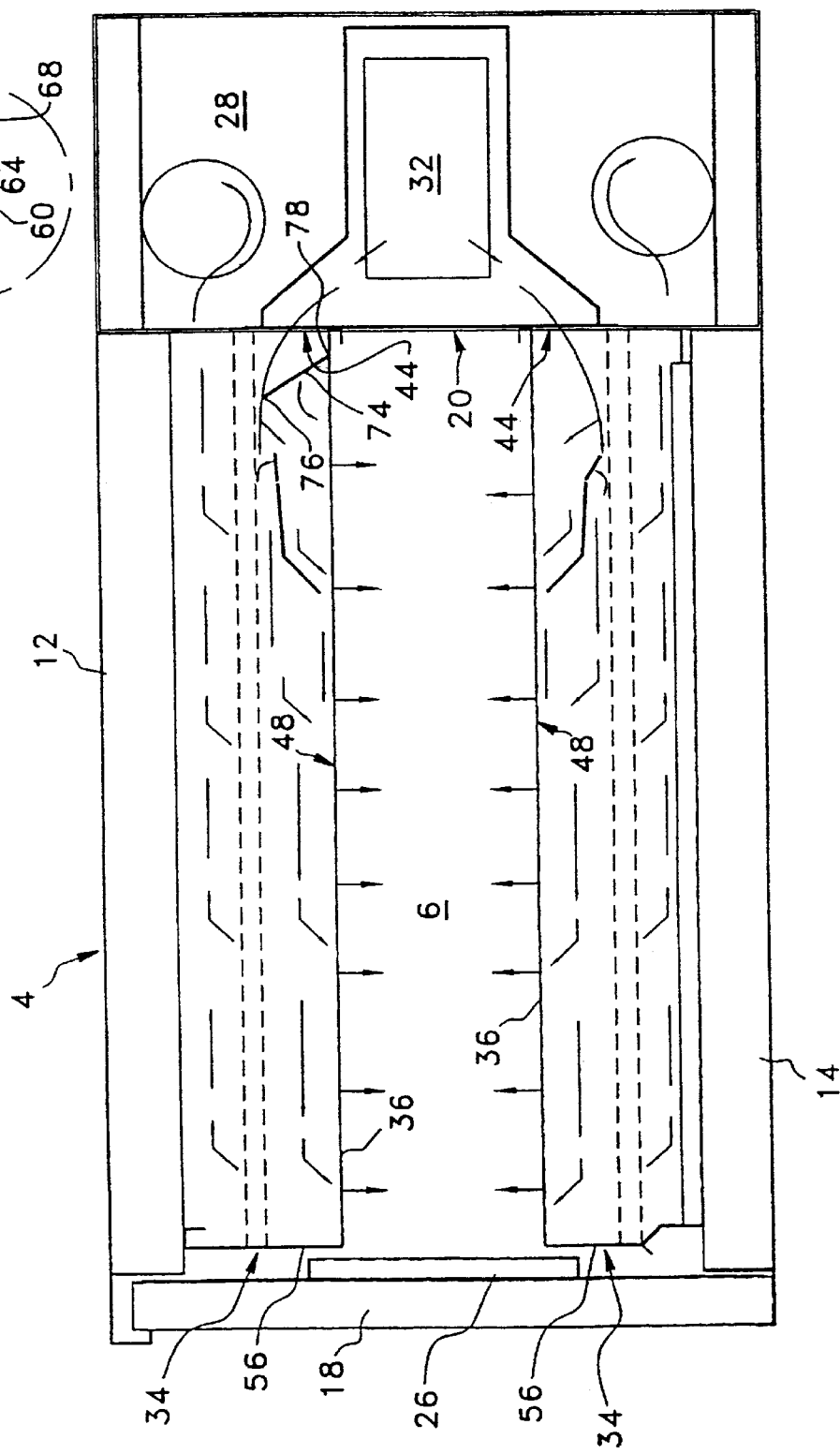
FIG. 2a is cross-sectional view of the oven of FIG. 1 taken along line II—II with the legs and conveyor removed, showing a blown air distributor mounted above the conveyor and another blown air distributor mounted below the conveyor and also showing the flow path of the circulated air in the oven.

The enclosure (4) is delimited by a top wall (12), a bottom wall (14), two opposite side walls (16), a front end wall (18) and a back end wall (20) as shown in FIG. 2a.

Two opposite apertures (22) through which a food receiving conveyor (24) passes to move food to be baked at a given speed inside the baking chamber (6) may be provided in the sidewalls (16). Advantageously, the oven (2) may comprise an access door (26) for easy loading of quick cooked items such as precooked meat.

Like prior art impingement convection food ovens, the oven (2) according to the invention comprises an air circulating system to circulate air within the baking chamber (6). Referring to FIGS. 2 to 5, the general principle of the circulation of air in such convection oven (2), which will be explained in more details herein after, is that the oven (2) comprises a blowing chamber (28) ultimately in open communication with the baking chamber (6) and including a blower (30), shown in FIG. 4, devised to draw the air from the baking chamber (6) to be reheated and recirculated. A plenum (32) is created downstream from the blower (30) which reinjects high velocity heated air back into the baking chamber (6) via blown air distributors (34) in open communication with the plenum (32) and the baking chamber (6). The arrows in FIGS. 2 to 5 show the flow path of the air in the oven.

Figure 4:
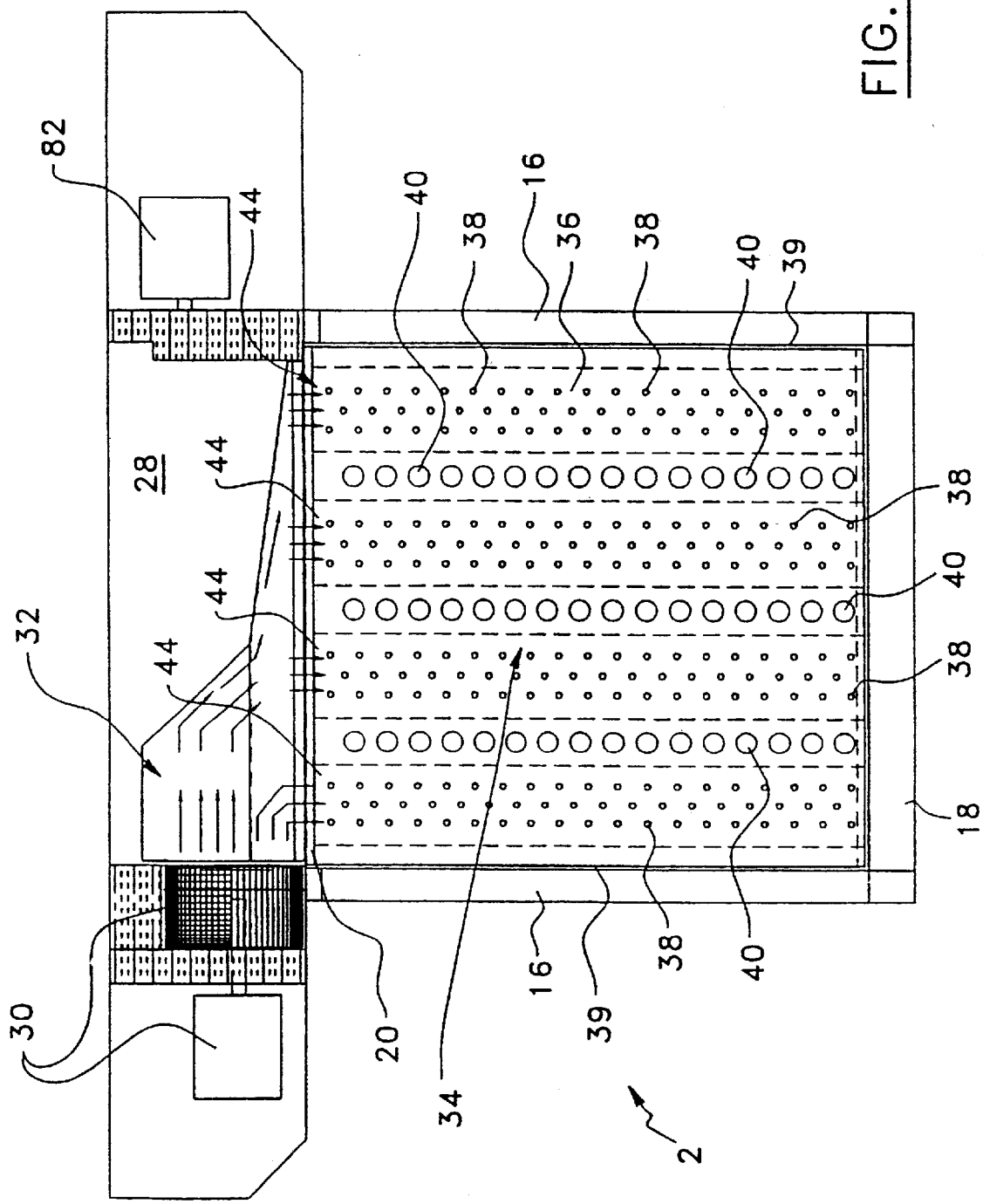
FIG. 4 is a top view of the oven of FIG. 1 with its top wall removed.
Figure 6:
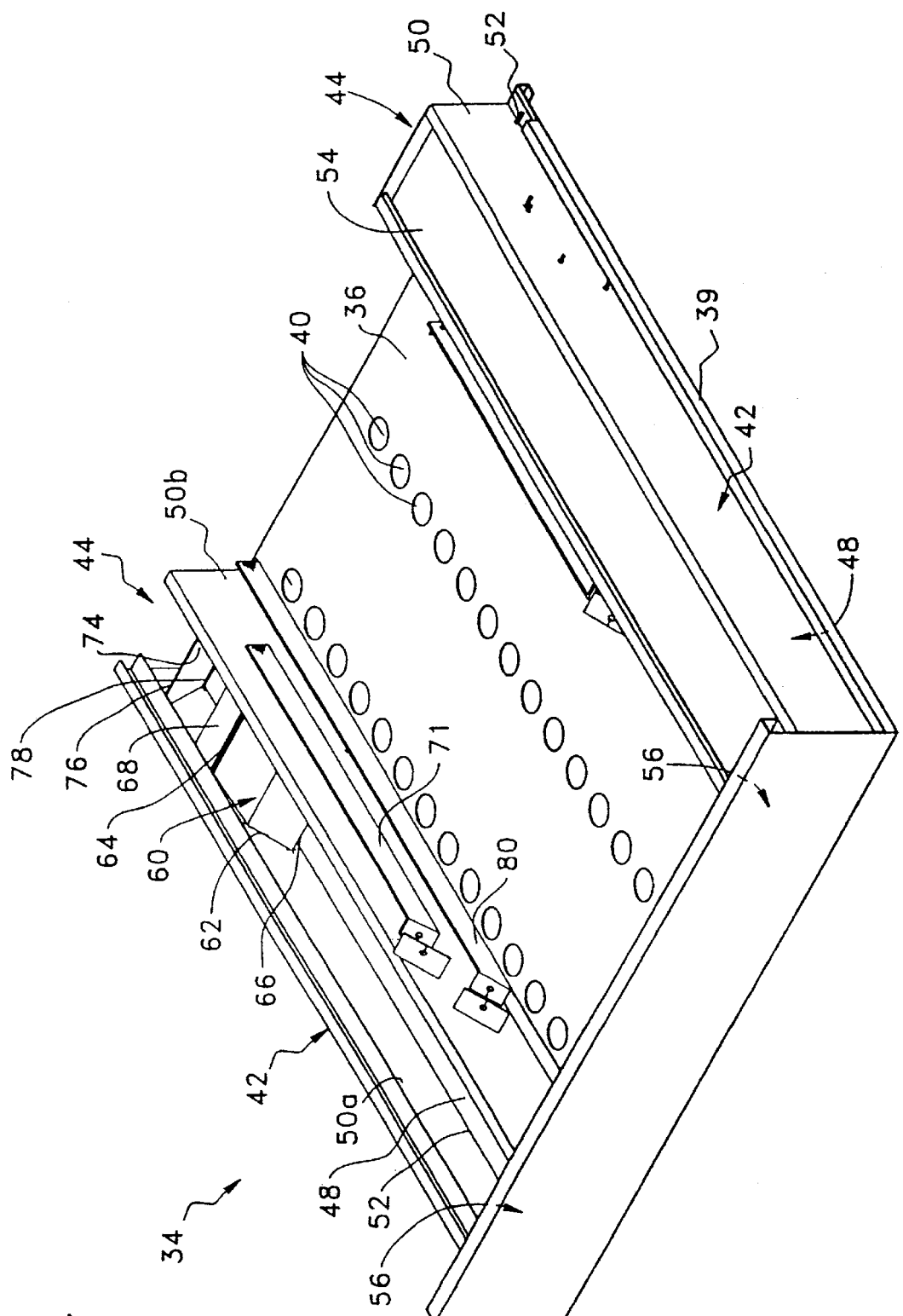
FIG. 6 is a perspective view of a preferred embodiment of a blown air distributor, one finger duct being illustrated with its upper plate removed to better see the adjustable deflector therein.

Referring more particularly to FIGS. 4 to 6, the blown air distributors (34) according to the present invention comprises a plurality of finger ducts (42) mounted in parallel on a single plate (36) removable from the baking chamber (6). Each finger duct (42) has an air inlet (44) to receive the high velocity heated air from the plenum (32) and a plurality of air outlets (38) to dispense the heated air in the baking chamber (6) in form of jet streams.

The single plate (36) of the blown air distributor (34) has opposite side edges (39) each slidably receivable in a guide way (37) provided on a corresponding side wall (16) of the baking chamber (6). The single plate (36) is also provided with a plurality of air inlets (40) to receive the air from the baking chamber (6) and drawn by the blower (30) and thereby providing a communication between the blowing chamber (28) and the baking chamber (6). As shown in the preferred embodiment illustrated, two blown air distributors (34) may be used with the oven (2), a first one (34a) for extending substantially in parallel with the top wall (12) above the conveyor (24) for cooking the upper surface of food and a second one (34b) for extending substantially in parallel with the bottom wall (14) below the conveyor (24) for cooking the bottom surface of food.

As best seen in FIG. 5, a passage or suction chamber (46) is defined all around the finger ducts (42). This suction chamber (46) is in open communication with the baking chamber (6) via a corresponding set of inlets (40) in the main plate (36).

Figure 3:
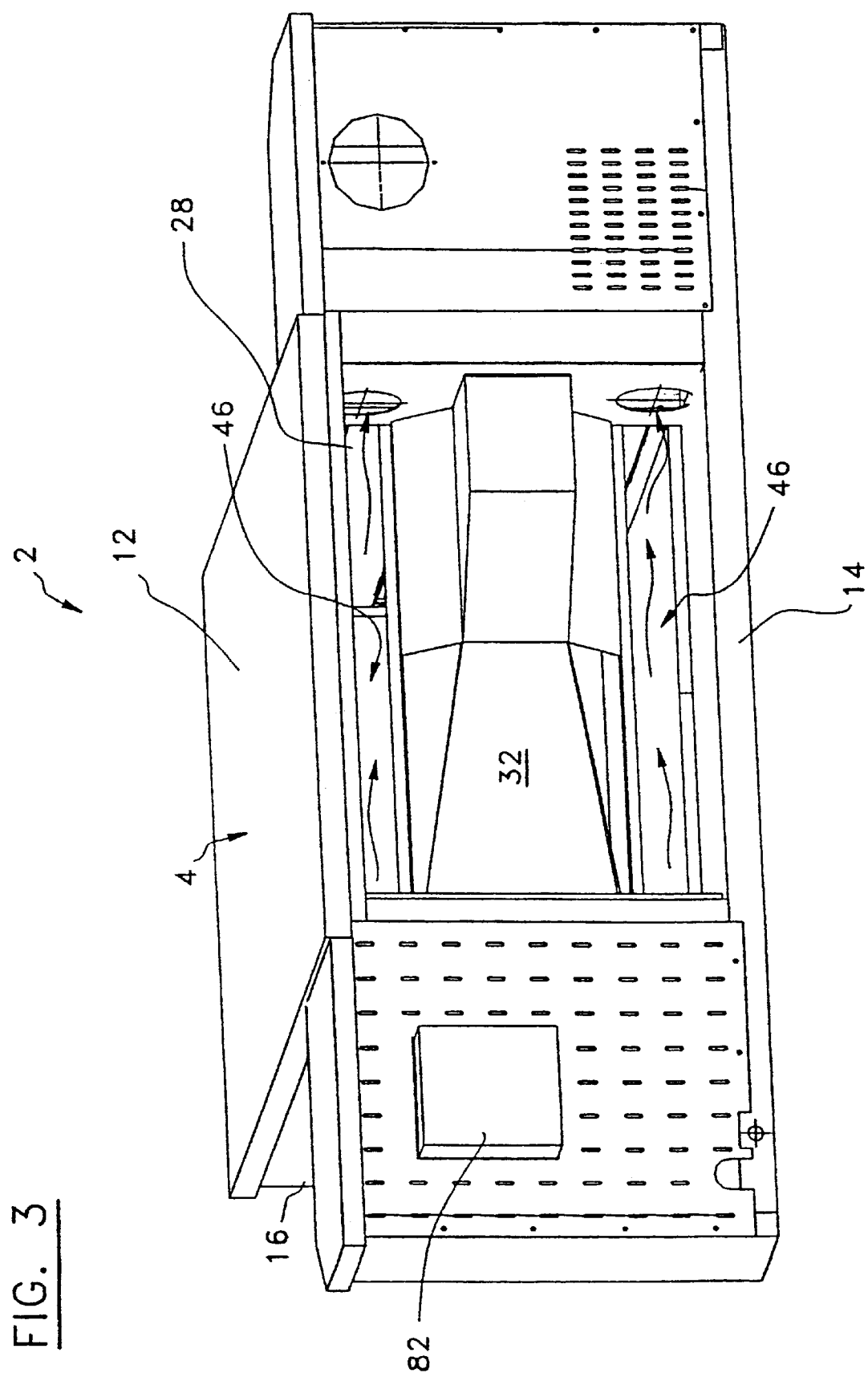
FIG. 3 is a back perspective view of the oven of FIG. 1 with its back panel and legs removed, showing the shape of the plenum.

Referring more particularly to FIGS. 2 to 4, the blowing chamber (28) of the oven mentioned before is in open communication with the plenum (32) and the suction chamber (46). The blowing chamber (28) includes a blower (30) for drawing the air from the baking chamber (6) then through the suction chamber (46) towards the plenum (32). A source of heat (82) is coupled with the blowing chamber (28) for heating the air drawn from the baking chamber (6) before a recirculation therein. Preferably, the source of heat (82) is a gas conversion burner mounted across the blowing chamber (28) and producing a flame (not illustrated) within the blowing chamber (28).

As illustrated in FIGS. 2 and 4, the air drawn from the baking chamber (6) through the suction chamber (46) passes through the blowing chamber (28) to be heated. In this preferred embodiment, the blowing chamber (28) extends behind the back end wall (20) of the oven (2). The plenum (32) of heated air is generated downstream from the blower (30). From the plenum (32) the heated air is reinjected back into the baking chamber (6) via the blown air distributors (34) which are in open communication with the baking chamber (6).

Referring to FIG. 6, each finger duct (42) comprises a bottom face (48) provided with a corresponding set of outlet openings (38) and two opposite side plates (50a, 50b) each having an edge (52) secured to the main plate (36). The finger duct (42) further comprises an upper plate (54) slidably received between the two side plates (50a, 50b).

The finger ducts (42) may be tapered or they may have a uniform rectangular cross section as the preferred embodiment illustrated.

The blown air distributors (34a, b) preferably comprise adjustable deflector means in each finger duct (42) to control a flow of heated air therein.

Referring to FIGS. 2 and 6, the adjustable deflector means comprises a first adjustable deflector in each finger duct (42) comprising a first inclined baffle wall (60) mounted within the finger duct (42) and having two opposite sides edges (62) secured to a corresponding side plate (50) of the finger duct (42). The baffle wall (60) comprises a back end (64) extending towards the inlet (44) of the finger duct (42) and a front end (66) spaced apart from the bottom face (48) and extending towards the front end wall (56) of the finger duct (42). The first deflector further comprises an adjustable plate (68) having an end (70) hinged to the back end (64) of the baffle wall (60), as best seen in FIG. 6. This adjustable plate (68) is pivotable between a downward position where most of the heated air received through the inlet (44) is directed towards the front end wall (56) of the finger duct (42) and an upward position where most of the heated air received through the inlet (44) of the finger duct (42) is directed generally under the first baffle wall (60).

A first operating handle (71) is mounted on an outer surface of a side plate (50) of the finger duct (42). This first operating handle (71) is operatively connected to the first adjustable plate (68) to pivot the same between its downward and its upward position.

Advantageously, the deflector means in each finger duct (42) may also be provided with a second deflector comprising a second baffle wall (74) mounted within the finger duct (42) close to the inlet (44) thereof. This second baffle wall (74) has a free end (76) opposed to another end (78) hinged directly to the bottom face (48) of the finger duct (42). The second baffle wall (74) is pivotable between a close position where it is closing the inlet (44) of the finger duct (42) and an open position where it is extending substantially parallel to the bottom face (48), such that the inlet (44) of the finger duct (42) is completely open. In this case, a second operating handle (80) is mounted on the outer surface of a side plate (50) of the finger duct (42). This second operating handle (80) is operatively connected to the second baffle wall (74) to pivot the same wall between its close position and its open position.

Depending on the food product to be cooked or the degree of cooking required, this second baffle (74) may be more or less opened. For example, if someone wishes a tender bottom face for its pizza, the pizza will be cooked with the second baffle (74) almost closed. On the other hand, if someone desires a crispier bottom face, the pizza will be cooked with the second baffle wall (74) is more open.

What is claimed is:

1. A blown air distributor for a baking chamber oven of the type comprising a baking chamber and a convection system including a blower to draw air from the baking chamber, a source of heat to heat the air drawn from the baking chamber and a plenum in open communication and downstream from the blower to recirculate heated air into the baking chamber, the blown air distributor comprising:
    a plurality of finger ducts mounted in parallel in the baking chamber, each finger duct having an air inlet to receive heated air from the plenum and a plurality of air outlets to dispsense the heated air in the baking chamber,
    wherein the finger ducts are mounted on a single plate removable from the baking chamber, the single plate having opposite side edges each slidably receivable in a guide way provided on a corresponding side wall of the baking chamber, and a plurality of air inlets to receive the air from the baking chamber and drawn by the blower.

2. A blown air distributor according to claim 1, characterized in that it comprises:
    adjustable deflector means in each finger duct for controlling a flow of heated air therein.

3. A blown air distributor according to claim 2, characterized in that each of adjustable deflector means comprises:
    a baffle wall having two opposite sides edges secured on a corresponding side plate of the finger duct a back end extending towards the inlet of the finger duct and a front end extending towards a front end wall of the finger duct;
    a controllable plate having an end hinged to the back end of the baffle wall and being pivotable between a downward position where most of the heated air received through the inlet of the finger duct is directed towards the front end wall of the finger duct and an upward position where most of the heated air received through the inlet of the finger duct is directed generally under the baffle wall; and
    an operating handle mounted on an outer surface of the finger duct and operatively connected to the controllable plate to pivot the plate between the downward and the upward position.

4. A blown air distributor according to claim 3, characterized in that adjustable deflector means further comprises:
    an additional baffle wall mounted within the finger duct close to the inlet thereof, the additional baffle wall having a free end opposed to an end hinged to an inner wall of the finger duct and being pivotable between a close position where the additional baffle wall is closing the inlet of the finger duct and an open position where the additional baffle wall is extending substantially parallel to said inner wall of the finger duct such that the inlet of the finger duct is fully open;
    an additional operating handle mounted on an outer surface of the finger duct and operatively connected to the additional baffle wall to pivot the additional baffle wall between the close position and the open position.

5. The combination of a convection oven, comprising:
    a baking chamber;
    a convection system associated with the baking chamber and including a blower to draw air from the baking chamber;
    a source of heat to heat the air drawn from the baking chamber and
    a plenum in open communication and downstream from the blower to recirculate high velocity heated air into the baking chamber; with a blown air distributor according to claim 1.

6. The combination according to claim 5, characterized in that the convection oven comprises an aerodynamically-shaped duct defining the plenum of the oven, the aerodynamically-shaped duct having an inlet in open communication with the blower and an outlet in open communication with the inlet of each of the finger duct.

7. A combination according to claim 6, characterized in that the convection oven comprises a conveyor to support food to be cooked.

8. A combination as claim in claim 7, characterized in that the convection oven comprises opposite side walls provided with an aperture through which the conveyor passes so as to move food to be baked.

9. A convection oven comprising:

a baking chamber having side walls;

guide ways mounted on each side wall;

a blower that draws air from the baking chamber;

a heat source that heats the air drawn from the baking chamber;

a plenum downstream from the blower and in communication with the blower to recirculate heated air into the baking chamber; and a blown air distributor including:

a single plate having side edges slideably mounted in the guide ways and a plurality of air inlets to receive air from the baking chamber and drawn by the blower; and a plurality of finger ducts mounted in parallel on the single plate, each finger duct having an air inlet to receive heated air from the plenum and a plurality of air outlets to dispsense the heated air in the baking chamber.

* * * * *